United States Patent
Kawakami

(10) Patent No.: US 11,061,298 B2
(45) Date of Patent: Jul. 13, 2021

(54) FOCAL-PLANE SHUTTER, AND IMAGING DEVICE AND ELECTRONIC APPARATUS COMPRISING FOCAL-PLANE SHUTTER

(71) Applicant: NIDEC COPAL CORPORATION, Tokyo (JP)

(72) Inventor: Kenta Kawakami, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/494,155

(22) PCT Filed: Aug. 13, 2018

(86) PCT No.: PCT/JP2018/009673
§ 371 (c)(1),
(2) Date: Sep. 13, 2019

(87) PCT Pub. No.: WO2018/168834
PCT Pub. Date: Sep. 20, 2018

(65) Prior Publication Data
US 2020/0012173 A1 Jan. 9, 2020

(30) Foreign Application Priority Data
Mar. 15, 2017 (JP) .............................. JP2017-049363

(51) Int. Cl.
*G03B 9/10* (2021.01)
*G03B 9/36* (2021.01)
(Continued)

(52) U.S. Cl.
CPC .................. *G03B 9/10* (2013.01); *G03B 9/36* (2013.01); *G03B 9/58* (2013.01); *H04N 5/2254* (2013.01)

(58) Field of Classification Search
USPC ......................................................... 396/452
See application file for complete search history.

(56) References Cited

U.S. PATENT DOCUMENTS

| 7,699,544 B2* | 4/2010 | Yamaguchi .............. G03B 9/08 396/453 |
| 2012/0087646 A1* | 4/2012 | Takahashi ................ G03B 9/36 396/470 |
| 2015/0277211 A1* | 10/2015 | Kawakami ........... H04N 5/2353 348/368 |

FOREIGN PATENT DOCUMENTS

| JP | 59-82226 U | 6/1984 |
| JP | 60-189733 A | 9/1985 |

(Continued)

OTHER PUBLICATIONS

International Search Report issued in corresponding International Patent Application No. PCT/JP2018/009673 dated Jun. 12, 2018.

*Primary Examiner* — Clayton E. LaBalle
*Assistant Examiner* — Warren K Fenwick
(74) *Attorney, Agent, or Firm* — Troutman Pepper Hamilton Sanders LLP

(57) ABSTRACT

A focal-plane shutter that has a shutter base plate that has an opening; a shutter blade that opens/closes the opening; a blade arm that pivotally supports the shutter blade; and a blade drive member that has a drive pin that is connected to the blade arm. The blade drive member rotates the blade arm so as to drive the shutter blade. The blade arm has a connection hole into which the drive pin is inserted; and a restriction member that is between an inner circumferential surface of the connection hole and an outer circumferential surface of the drive pin and that restricts the movement of the drive pin inside the connection hole.

6 Claims, 7 Drawing Sheets

(51) Int. Cl.
*G03B 9/58* (2021.01)
*H04N 5/225* (2006.01)

(56) References Cited

FOREIGN PATENT DOCUMENTS

| | | |
|---|---|---|
| JP | 2000-122111 A | 4/2000 |
| JP | 2007-298866 A | 11/2007 |
| JP | 2015-111201 A | 6/2015 |
| JP | 2016-11980 A | 1/2016 |
| JP | 2016-27362 A | 2/2016 |
| JP | 2016-161839 A | 9/2016 |

* cited by examiner

[FIG. 1]
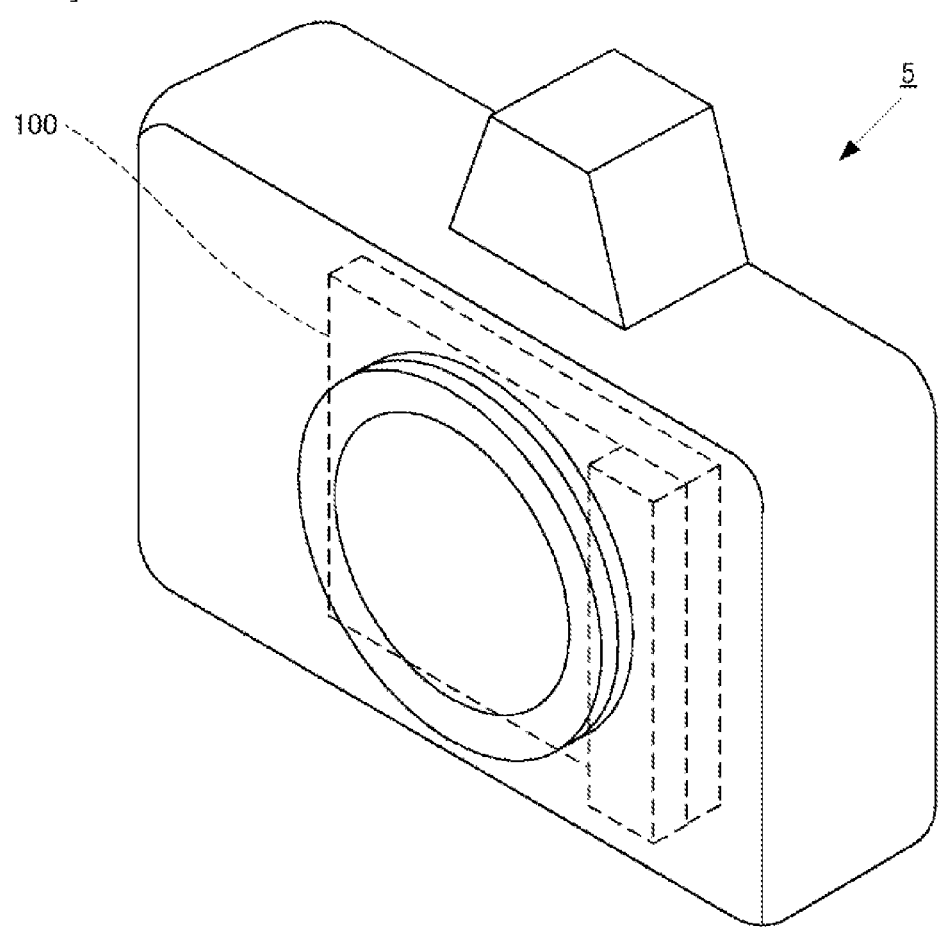

[FIG. 2]
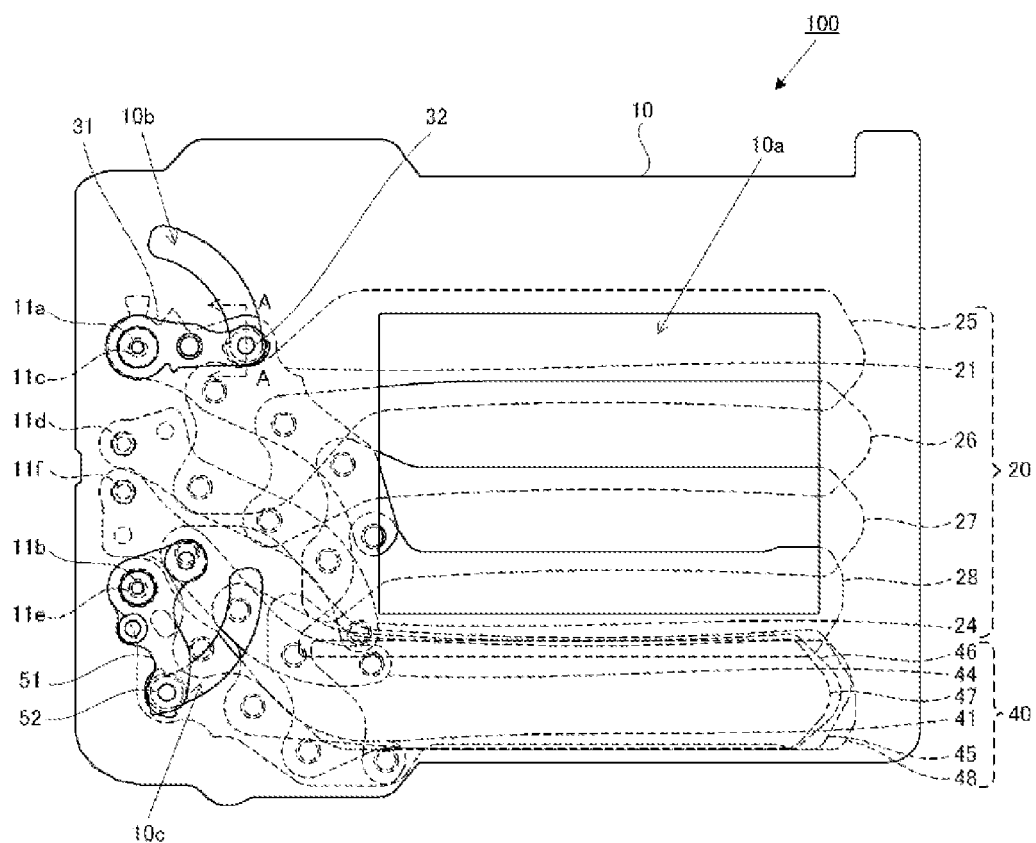

[FIG. 3]
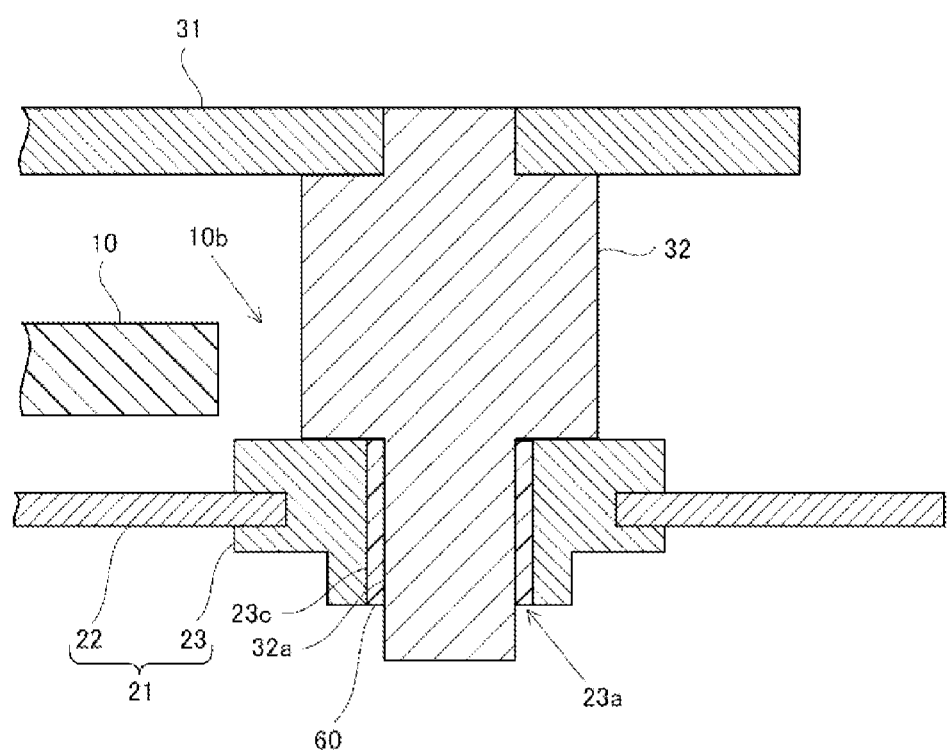

[FIG. 4]
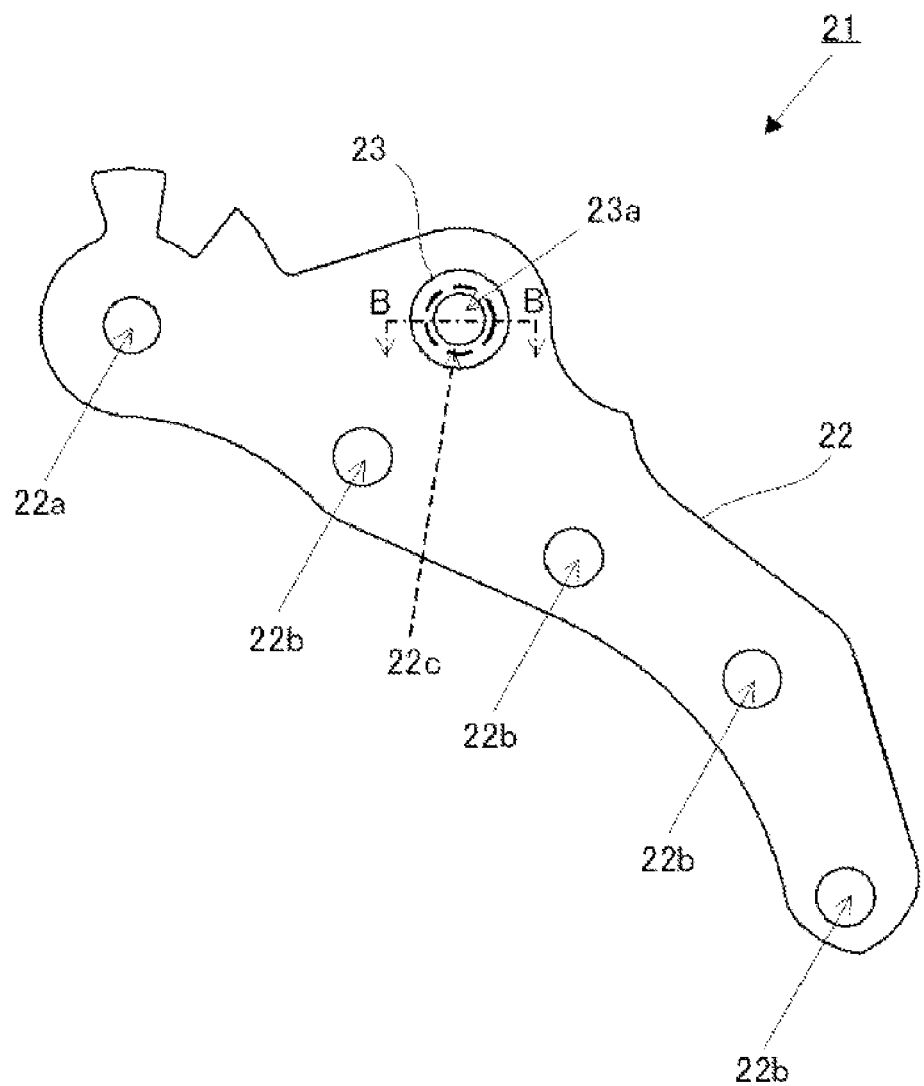

[FIG. 5]
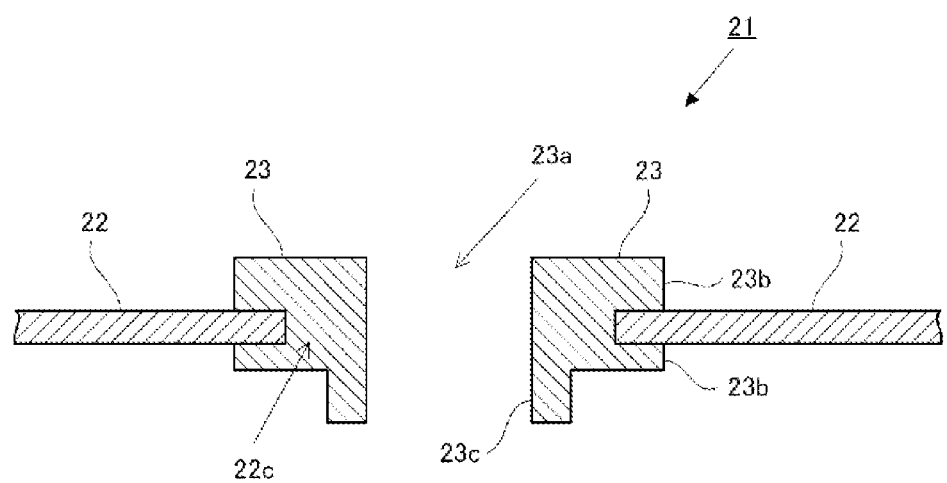

[FIG. 6]
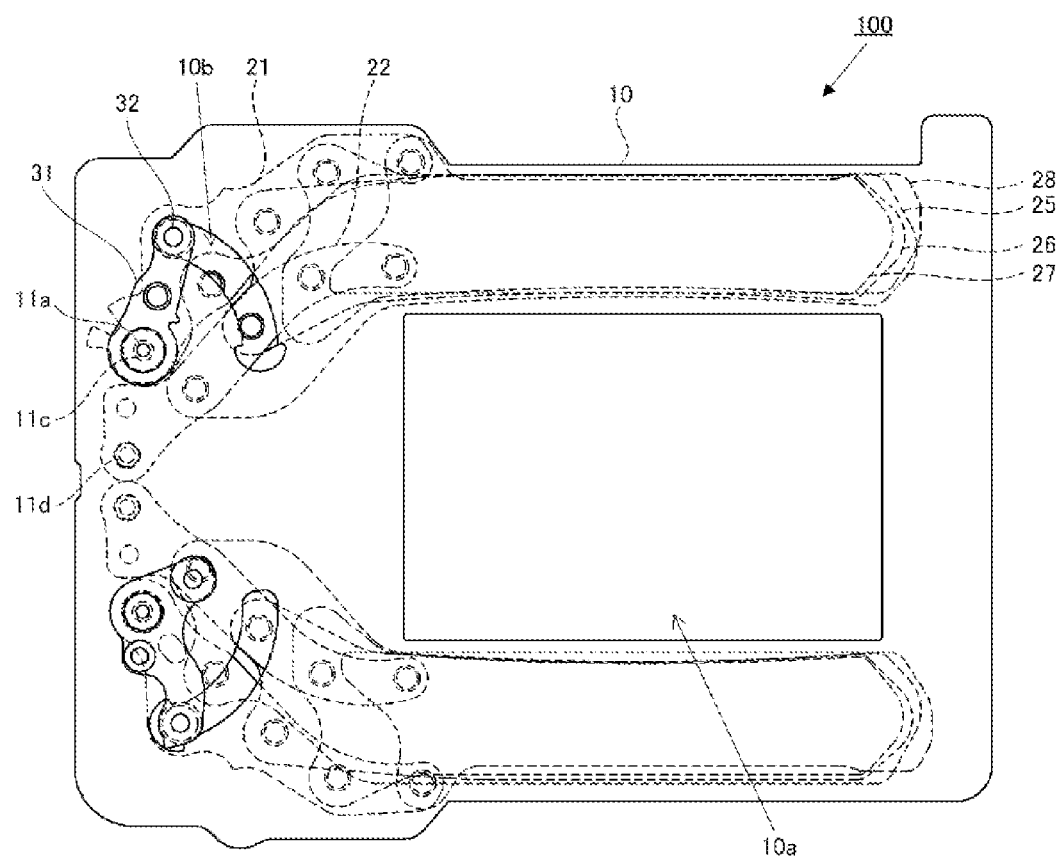

[FIG. 7]
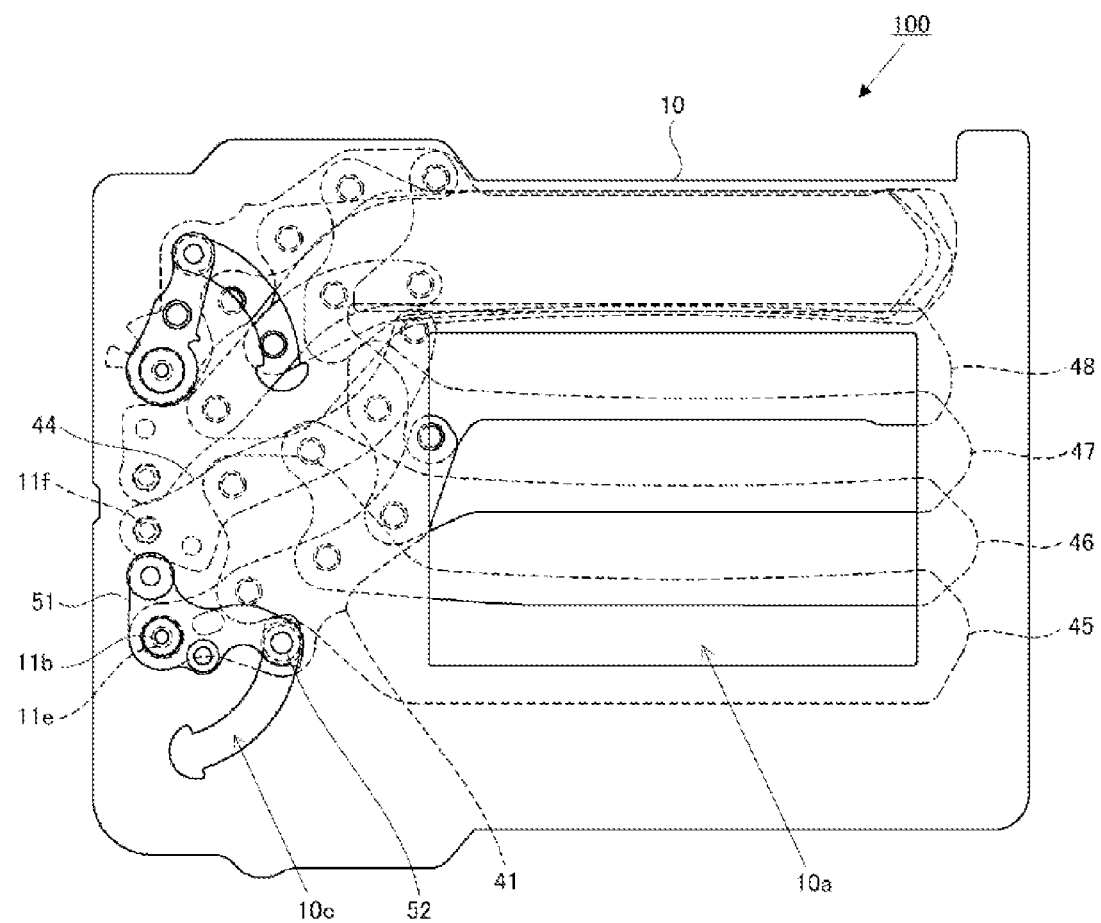

FOCAL-PLANE SHUTTER, AND IMAGING DEVICE AND ELECTRONIC APPARATUS COMPRISING FOCAL-PLANE SHUTTER

CROSS-REFERENCE TO RELATED APPLICATIONS

This application is a National Stage of International Application No. PCT/JP2018/009673 filed Mar. 13, 2018, which claims priority to Japanese Patent Application No. 2017-049363 filed Mar. 15, 2017. All applications are herein incorporated by reference in their entirety,

FIELD OF TECHNOLOGY

The present invention relates to a focal plane shutter, and to an imaging device and electronic apparatus provided therewith.

BACKGROUND

There are known focal plane shutters wherein the shutter blades are driven through a blade driving member rotating a blade arm.

For example, Japanese Unexamined Patent Application Publication 2016-161839 discloses a focal plane shutter wherein a blade driving member and a blade arm are connected through insertion of a driving pin of the blade driving member into a connecting hole of the blade arm. In the focal plane shutter of Japanese Unexamined Patent Application Publication 2016-161839, the blade arm is swiveled through rotation of a blade driving member, so that the shutter blade that is supported so as to pivot on the blade arm will travel.

SUMMARY OF THE INVENTION

Because there is a space (room) between the driving pin and the connecting hole of the blade arm, when the focal plane shutter is actuated, the driving pin and the blade arm undergo sliding motion relative to each other. This sliding of the driving pin and the blade arm causes wear in the blade arm, shortening the service life of the focal plane shutter. Moreover, the detritus from the wear, produced through the sliding of the driving pin and the blade arm, may become adhered to the imaging element of the imaging device. On the other hand, if the driving pin were to be tightly secured to the blade arm, there would be no room that would allow movement of the shutter blade on the blade arm, making smooth travel of the shutter blade difficult.

The present invention was created in contemplation of the situation set forth above, and the object thereof is to provide a focal plane shutter able to suppress wear of the blade arm, and an imaging device and an electronic apparatus provided therewith.

In order to achieve the object set forth above, a focal plane shutter according to a first aspect according to the present invention includes a shutter base plate that has an opening; a shutter blade for opening/closing the opening; a blade arm for pivot-supporting the shutter blade; and a blade driving member, having a driving pin that connects to the blade arm, for driving the shutter blade by causing the blade arm to swivel. Wherein the blade arm has a connecting hole into which the driving pin is inserted; and a suppressing material, for suppressing movement of the driving pin within the interior of the connecting hole, is present between the outer peripheral surface of the driving pin and the inner peripheral surface of the connecting hole.

The suppressing material may suppress movement of the driving pin in the direction of rotation of the blade arm within the interior of the connecting hole.

The blade arm may comprise:
a bushing and wherein the connecting hole is located; and an arm that has a through hole into which the bushing is fitted.

The suppressing material may be an elastic body.

Rubbing between the driving pin and the blade arm can be reduced through the structures in (1) through (4), above, enabling prevention of wear of the blade arm.

The suppressing material may be viscous or tacky.

The structure above can both prevent wear of the blade arm and prevent contamination, such as detritus, dust, or the like, caused by the wear.

An imaging device according to a second aspect of the present invention is equipped with the focal plane shutter described above.

An electronic apparatus according to a third aspect of the present invention is equipped with the focal plane shutter described above.

Effects of the Invention

The present invention enables prevention of wear of the blade arm.

BRIEF DESCRIPTIONS OF THE DRAWINGS

FIG. 1 is a schematic diagram depicting an imaging device equipped with a focal plane shutter according to an embodiment according to the present invention.

FIG. 2 is a schematic diagram depicting the initial state, in imaging, of the focal plane shutter according to the present embodiment according the present invention.

FIG. 3 is a cross-sectional drawing wherein the focal plane shutter depicted in FIG. 2 is viewed at the section A-A.

FIG. 4 is a plan view depicting a first front blade arm according to the present embodiment according to the present invention.

FIG. 5 is a cross-sectional drawing wherein the first front blade arm, depicted in FIG. 4, is viewed at the section B-B.

FIG. 6 is a schematic diagram depicting an exposing operation of the front blade in imaging using the focal plane shutter according to the present embodiment according to the present invention.

FIG. 7 is a schematic diagram depicting an exposing operation of the rear blade in imaging using the focal plane shutter according to the present embodiment according to the present invention.

DETAILED DESCRIPTION

A focal plane shutter according to an embodiment according to the present invention will be explained in reference to the drawings.

As illustrated in FIG. 1, the focal plane shutter 100 according to the present embodiment is installed in an imaging device 5 that has an imaging element, an imaging lens, and the like. The imaging element is an image sensor such as, for example, a CCD (charge-coupled device), or a CMOS (complementary metal oxide semiconductor). The imaging device 5 is, for example, a digital camera, a monitoring camera, a vehicle-mounted camera, or the like.

The structure of the focal plane shutter 100 will be explained in reference to FIGS. 2-5. FIG. 2 depicts the initial state of the focal plane shutter 100 when each member has been set to the position for awaiting imaging. FIG. 3 depicts a cross-section when the focal plane shutter 100 depicted in FIG. 2 is viewed at the section A-A. Note that the explanation in FIG. 2 assumes the front face side is the imaging subject side in the imaging device 5, and the back face side is the imaging element side in the imaging device 5. Moreover, for ease in understanding, the middle plate, the supplementary base plate, the shutter blade, etc., described below are omitted in FIG. 3.

The focal plane shutter 100, as illustrated in FIG. 2 and FIG. 3, comprises: a shutter base plate 10, a front blade 20, a front blade driving member 31, a rear blade 40, a rear blade driving member 51, and a suppressing material 60. The front blade 20 and the rear blade 40 open and close the opening 10a of the shutter base plate 10. The front blade driving member 31 drives the front blade 20. The front blade driving member 31 has a driving pin 32 that is connected to the front blade 20. The rear blade driving member 51 drives the rear blade 40. The rear blade driving member 51 has a driving pin 52 that is connected to the rear blade 40. The suppressing material 60 suppresses movement of the driving pins 32 and 52.

(Shutter Base Plate)

The shutter base plate 10, as illustrated in FIG. 2, is formed in an essentially rectangular flat plate shape, from synthetic resin, or the like. The shutter base plate 10 has a rectangular opening 10a in essentially the center portion thereof.

Additionally, on the imaging element side of the shutter base plate 10, a middle plate, not shown, for defining a blade chamber for containing the front blade 20, and a supplementary base plate, not shown, for defining a blade chamber for containing the rear blade 40, are attached with prescribed spacing. Openings with shapes that are analogous to the shape of the opening 10a of the shutter base plate 10 are formed in essentially the center portions of the middle plate and of the supplementary base plate. The opening, as a shutter through which passes light from the imaging subject, is formed by superimposing the opening of the middle plate, the opening of the supplementary base plate, and the opening 10a of the shutter base plate 10. In the present embodiment, the explanation will assume that the shape of the opening in the middle plate, the shape of the opening in the supplementary base plate, and the shape of the opening 10a in the shutter base plate 10 are identical.

Two arc-shaped elongated holes 10b and 10c are formed in a region on the left side of the shutter base plate 10. Elongated holes having essentially identical shapes to the elongated holes 10b and 10c are formed in the region of the middle plate that overlaps the elongated holes 10b and 10c, and the region of the supplementary base plate that overlaps the elongated holes 10b and 10c.

Shafts 11a and 11b are provided standing on the front face of the shutter base plate 10, that is, on the face on the imaging subject side. Moreover, shafts 11c, 11d, 11e, and 11f stand on the back face of the shutter base plate 10, that is, on the face on the side that is toward the imaging element. Shafts 11a and 11c are provided standing concentrically. Moreover, shafts 11b and 11e are provided standing concentrically.

(Front Blade)

The front blade 20 is a mechanical front curtain shutter. The front blade 20 is driven by a front blade driving member 31, to travel within the blade chamber. The front blade 20, as illustrated in FIG. 2, has a first front blade arm 21, a second front blade arm 24, and shutter blades 25, 26, 27, and 28.

The first front blade arm 21 has one end thereof attached so as to be able to swivel on the shaft 11c. Additionally, the first front blade arm 21 pivot-supports the four shutter blades 25 through 28, sequentially, toward the other in thereof, which is the free end. Moreover, the first front blade arm 21 is connected to the front blade driving member 31 through a driving pin 32 of the front blade driving member 31. Through this, the first front blade arm 21 is pushed in the counterclockwise direction by a driving pin 32, through rotation of the front blade driving member 31 in the counterclockwise direction, so as to rotate in the counterclockwise direction around the shaft 11c.

The first front blade arm 21, as illustrated in FIG. 4 and FIG. 5, is structured from an arm 22 and a bushing 23.

As illustrated in FIG. 4, the arm 22 has a through hole 22a into which the shaft 11c is inserted, and a through hole 22b, for pivot-supporting the shutter blades 25-28. Additionally, the arm 22 has a through hole 22c into which the bushing 23 is fitted.

As illustrated in FIG. 4 and FIG. 5, the bushing 23 is a member with a round cylindrical shape. The bushing 23 has a connecting hole 23a into which the driving pin 32 of the front blade driving member 31 is inserted, and a flange 23b. The bushing 23 functions as a sleeve for the driving pin 32, through fitting into the through hole 22c of the arm 22. The configuration of the connecting hole 23a and the driving pin 32 is described below.

As illustrated in FIG. 2, one end of a second front blade arm 24 is attached so as to be able to swivel on the shaft 11d. The second front blade arm 24 swivels, centered on the shaft 11d, following the first front blade arm 21. Additionally, as with the first front blade arm 21, shutter blades 25 through 28 are pivot-supported on the second front blade arm 24, sequentially toward the other end, which is the free end thereof.

The second front blade arm 24 has a through hole, not illustrated, into which the shaft 11d is inserted, and a through hole, not illustrated, for pivot-supporting the shutter blades 25-28.

The shutter blades 25 through 28 are pivot-supported on the first front blade arm 21 and the second front blade arm 24. The shutter blades 25 through 28 are pivot-supported on the first front blade arm 21 and the second front blade arm 24 using, as connecting shafts, connecting pins that are inserted into the through hole 22b of the arm 22 or the through hole of the second front blade arm 24. Consequently, there are gaps between the connecting shafts and the through holes of the shutter blades 25 through 28.

The shutter blades 25 through 28 travel from the bottom to the top of the opening 10a accompany swiveling of the first front blade arm 21 in the counterclockwise direction. The opening 10a is opened by the shutter blades 25 through 28 thereby. The shutter blades 25-28 also move from the top to the bottom of the opening 10a. The opening 10a is closed by the shutter blades 25-28 thereby. Note that the shutter blade 28 is a slitted blade, having a slit formed therein.

(Front Blade Driving Member)

The front blade driving member 31 is attached to the shaft 11a so as to be able to rotate. The front blade driving member 31 drives the front blade 20 through rotation in the counterclockwise direction through the biasing force of a front blade driving spring, not illustrated. The front blade driving spring is a coil spring that is fitted onto the shaft 11a. The front blade driving spring biases the front blade driving member 31 in the counterclockwise direction. The front blade driving member 31 has, at the tip end portion thereof, a driving pin 32 that extends to the imaging element side.

The driving pin 32 of the front blade driving member 31 is inserted into the elongated hole 10b of the shutter base plate 10. The driving pin 32 that is inserted into the elongated hole 10b is inserted into the connecting hole 23a of the first front blade 21. Through this, the front blade driving member 31 is connected to the front blade 20 within the blade chamber. The driving pin 32 rotates centered on the shaft 11a. The configuration of the driving pin 32 in the connecting hole 23a will be described below.

(Suppressing Material)

The suppressing material 60, as illustrated in FIG. 3, is provided between the outer peripheral surface 32a of the driving pin 32 of the front blade driving member 31 and the inner peripheral surface 23c of the connecting hole 23a of the bushing 23. The suppressing material 60 suppresses movement of the driving pin 32 in the direction of rotation of the first front blade arm 21 (the counterclockwise direction) within the hole that is the connecting hole 23a. The suppressing material 60 is a material for reducing the kinetic energy of the driving pin 32 within the opening of the connecting hole 23a. The suppressing material 60 is a liquid or semi-solid material such as lubricating oil, a dust trap, a gel, or the like, that is viscous or tacky.

The suppressing material 60 reduces the speed of movement (kinetic energy) of the driving pin 32 within the opening of the connecting hole 23a, doing so through viscosity or the adhesive force, to reduce the rubbing between the outer peripheral surface 32a of the driving pin 32 and the inner peripheral surface 23c of the connecting hole 23a. Moreover, the suppressing material 60, through a lubricating effect, reduces friction between the outer peripheral surface 32a of the driving pin 32 and the inner peripheral surface 23c of the connecting hole 23a. Through this, the suppressing material 60 is able to prevent wear of the first front blade arm 21. Additionally, because the suppressing material 60 is a liquid or a semi-solid material, room that enables movement of the shutter blades 25 through 28 in the first front blade arm 21 and the second front blade arm 24 is produced through movement of the driving pin 32 within the connecting hole 23a. Note that preferably the kinematic viscosity of the suppressing material 60 is no less than 100 mm$^2$ per gram and no greater than 5000 mm$^2$ per gram.

The suppressing material 60 is provided between the outer peripheral surface 32a of the driving pin 32 and the inner peripheral surface 23c of the connecting hole 23a through, for example, insertion, into the connecting hole 23a of the first front blade arm 21, of the driving pin 32 after having been coated with the suppressing material 60.

(Rear Blade)

The rear blade 40 is a mechanical back curtain shutter. The rear blade 40 is driven by a rear blade driving member 51, to travel within the blade chamber. The rear blade 40, as illustrated in FIG. 2, has a first rear blade arm 41, a second rear blade arm 44, and shutter blades 45, 46, 47, and 48.

The first rear blade arm 41 has one end thereof attached so as to be able to swivel on the shaft 11e. Additionally, the first rear blade arm 41 pivot-supports the four shutter blades 45 through 48, sequentially toward the other in thereof, which is the free end. Moreover, as with the first front blade arm 21, the first rear blade arm 41 is connected to the rear blade driving member 51 through a driving pin 52 of the rear blade driving member 51. Through this, the first rear blade arm 41 is rotated in the counterclockwise direction around the shaft 11e through the rotation of the rear blade driving member 51 in the counterclockwise direction.

The first rear blade arm 41 is configured from an arm and a bushing, not shown, in the same manner as the first front blade arm 21. The configuration of the arm and bushing of the first rear blade arm 41 is the same as the configuration of the arm 22 and bushing 23 of the first front blade arm 21. The driving pin 52 of the rear blade driving member 51 is inserted into the connecting hole of the bushing of the first rear blade arm 41.

The second rear blade arm 44 has one end thereof attached so as to be able to swivel on the shaft 11f. The second rear blade arm 44 swivels, centered on the shaft 11f, following the first rear blade arm 41. Additionally, as with the first rear blade arm 41, shutter blades 45 through 48 are pivot-supported on the second rear blade arm 44, sequentially toward the other end, which is the free end thereof. The second rear blade arm 44 has a through hole, not illustrated, into which the shaft 11f is inserted, and a through hole, not illustrated, for pivot-supporting the shutter blades 45-48.

The shutter blades 45-48, in the same manner as with the shutter blades 25-28 of the front blade 20, are pivot-supported on the first rear blade arm 41 and the second rear blade arm 44. Consequently, there are gaps between the connecting shafts and the through holes of the shutter blades 45 through 48.

The shutter blades 45 through 48 travel from the bottom to the top of the opening 10a accompany swiveling of the first rear blade arm 41 in the counterclockwise direction. The opening 10a is closed by the shutter blades 45-48 thereby. The shutter blades 45-48 also move from the top to the bottom of the opening 10a. The opening 10a is opened by the shutter blades 45 through 48 thereby. Note that the shutter blade 48 is a slitted blade, having a slit formed therein.

(Rear Blade Driving Member)

As illustrated in FIG. 2, the rear blade driving member 51 is attached to the shaft 11b so as to be able to rotate. The rear blade driving member 51 drives the rear blade 40 through rotation in the counterclockwise direction through the biasing force of a rear blade driving spring, not illustrated. The rear blade driving spring is a coil spring that is fitted on the shaft 11b. The rear blade driving spring biases the rear blade driving member 51 in the counterclockwise direction. The rear blade driving member 51 has, at the tip end portion thereof, a driving pin 52 that extends to the imaging element side.

The driving pin 52 of the rear blade driving member 51 is inserted into the elongated hole 10c of the shutter base plate 10. The driving pin 52 that is inserted into the elongated hole 10c is inserted into the connecting hole of the bushing of the first rear blade arm 41 in the same manner as with the driving pin 32 of the front blade driving member 31. Through this, the rear blade driving member 51 is connected to the rear blade 40 within the blade chamber. The driving pin 52 rotates centered on the shaft 11b.

The suppressing material 60 is provided between the outer peripheral surface of the driving pin 52 and the inner peripheral surface of the connecting hole of the first rear blade arm 41 in the same manner as with the driving pin 32 of the front blade driving member 31 and the connecting hole 23a of the first front blade arm 21. Consequently, the wear of the first rear blade arm 41 can be prevented in the same manner as with the first front blade arm 21. Additionally, this makes it possible for the driving pin 52 to produce space that allows movement of the shutter blades 45-48 in the first rear blade arm 41 and the second rear blade arm 44.

The operation of the focal plane shutter 100 will be explained next in reference to FIG. 2, FIG. 6, and FIG. 7. Note that in FIG. 6 and FIG. 7, for ease in understanding, reference symbols are shown for only those members relevant to the respective operations.

Prior to commencement of imaging by the imaging device 5, the focal plane shutter 100 stands by in the initial state. As illustrated in FIG. 2, in the initial state of the focal plane shutter 100, the shutter blades 25-28 of the front blade 20 are in a deployed state, closing the opening 10a. The front blade driving member 31 is engaged with an engaging portion, not shown, in a state wherein a biasing force is applied by the front blade driving spring. The driving pin 32 of the front blade driving member 31 is positioned at the bottom end of the elongated hole 10b. Furthermore, the shutter blades 45 through 48 of the rear blade 40 are positioned below the opening 10a, in a state wherein they are overlapping. The rear blade driving member 51 is engaged with an engaging portion in a state wherein a biasing force is applied by the rear blade driving spring. The driving pin 52 of the rear blade driving member 51 is positioned at the bottom end of the elongated hole 10c.

Imaging by the imaging device 5 is started through pressing of the release button of the imaging device 5, and the focal plane shutter 100 begins the exposing operation. When the release button of the imaging device 5 is pressed, the engagement of the front blade driving member 31 by the engaging portion is released. The front blade driving member 31, having been released from the engagement, is rotated in the counterclockwise direction around the shaft 11a through the biasing force of the front blade driving spring. The driving pin 32 of the front blade driving member 31, after moving in the clockwise direction within the opening of the connecting hole 23a of the first front blade arm 21, pushes the inner peripheral surface 23c of the connecting hole 23a in the counterclockwise direction around the shaft 11a. Given this, the driving pin 32 causes the first front blade arm 21 to swivel in the counterclockwise direction around the shaft 11c. The driving pin 32 pushes the first front blade arm 21 in the counterclockwise direction, and also rotates in the counterclockwise direction around the shaft 11a, to travel from the bottom end to the top end of the elongated hole 10b. In the present embodiment, the suppressing material 60 that is provided between the outer peripheral surface 32a of the driving pin 32 in the inner peripheral surface 23c of the connecting hole 23a suppresses movement of the driving pin 32 in the direction of rotation of the first front blade arm 21 within the opening of the connecting hole 23a of the first front blade arm 21. Consequently, the rubbing between the outer peripheral surface 32a of the driving pin 32 and the inner peripheral surface 23c of the connecting hole 23a is reduced. Moreover, through the lubricating effect of the suppressing material 60, the friction between the outer peripheral surface 32a of the driving pin 32 and the inner peripheral surface 23c of the connecting hole 23a is reduced. The wear of the first front blade arm 21 is reduced thereby.

The first front blade arm 21 that is pushed by the driving pin 32 rotates in the counterclockwise direction. Through the swiveling of the first front blade arm 21 in the counterclockwise direction, the shutter blades 25 through 28 travel from the bottom to the top of the opening 10a, to produce an overlapping state. Given this, the shutter blades 25-28 open the opening 10a, as illustrated in FIG. 6. In the present embodiment, the driving pin 32 moves within the opening of the connecting hole 23a, producing room that allows movement of the shutter blades 25 through 28 in the first front blade arm 21 and the second front blade arm 24. This enables the shutter blades 25 through 28 to travel smoothly.

After a prescribed time has elapsed after engagement of the front blade driving member 31 has been released, the engagement of the rear blade driving member 51 is then released. The rear blade driving member 51, having been released from the engagement, is rotated in the counterclockwise direction around the shaft 11b through the biasing force of the rear blade driving spring. As with the driving pin 32 of the front blade driving member 31, the driving pin 52 of the rear blade driving member 51 rotates the first rear blade arm 41 in the counterclockwise direction after movement moving in the counterclockwise direction within the opening of the connecting hole of first rear blade arm 41 around the shaft 11b. The driving pin 52 rotates the first rear blade arm 41 in the counterclockwise direction around the shaft 11e, and also rotates in the counterclockwise direction around the shaft 11b, to travel from the bottom end to the top end of the elongated hole 10c. In this case as well, the suppressing material 60 suppresses movement of the driving pin 52 in the direction of rotation of the first rear blade arm 41 (the counterclockwise direction) within the opening of the connecting hole of the first rear blade arm 41, and thus the rubbing between the outer peripheral surface of the driving pin 52 and the inner peripheral surface of the connecting hole is reduced. Moreover, through the lubricating effect of the suppressing material 60, the friction between the outer peripheral surface of the driving pin 52 and the inner peripheral surface of the connecting hole of the first rear blade arm 41 is reduced. The wear of the first rear blade arm 41 is reduced thereby.

The first rear blade arm 41 is pushed by the driving pin 52 to swivel in the counterclockwise direction around the shaft 11e. The shutter blades 45-48 move from the bottom to the top of the opening 10a, to produce the released state. Given this, the shutter blades 45-48 close the opening 10a, as illustrated in FIG. 7. In this case as well, the driving pin 52 moves in the opening of the connecting hole of the first rear blade arm 41, producing space that allows movement of the shutter blades 45-48, so that the shutter blades 45-48 will travel smoothly.

The exposing operation by the focal plane shutter 100 is completed thereby. An image of the photographic subject is captured by the imaging element of the imaging device 5 while the focal plane shutter 100 is carrying out the exposing operation.

After the exposing operation has been completed, a setting portion, not shown, is pressed to cause the front blade driving member 31 and the rear blade driving member 51 to rotate in the clockwise direction. The focal plane shutter 100 is returned to the initial state thereby. The focal plane shutter 100 stands by in the initial state until the next imaging operation.

As described above, the suppressing material 60 suppresses movement of the driving pin 32 in the direction of rotation of the first front blade arm 21 within the opening of the connecting hole 23a of the first front blade arm 21, and thus the focal plane shutter 100 enables a reduction in wear of the first front blade arm 21. The focal plane shutter 100 enables a reduction in wear of the first rear blade arm 41 as well, in the same manner as with the first front blade arm 21. Through the lubricating effect of the suppressing material 60, the focal plane shutter 100 is able to reduce further the wear in the first front blade arm 21 and the first rear blade arm 41. Furthermore, contamination, such as wear detritus of the various members of the focal plane shutter 100, dust within the imaging device 5, and the like, is adsorbed by the viscosity or tackiness of the suppressing material 60, enabling prevention of scattering of this contamination.

The present invention is not limited to the embodiments set forth above, but rather may be varied in a variety of ways.

For example, the first front blade arm 21 need not be provided with the bushing 23, but instead the driving pin 32 of the front blade driving member 31 may be inserted into the through hole 22*c* the arm 22. In this case, the suppressing material 60 would be provided between the outer peripheral surface 32*a* of the driving pin 32 and the inner peripheral surface of the through hole 22*c*. Furthermore, the front blade 20 and the rear blade 40 are not limited to a single driving member, but rather driving may be through a driving portion that has a first driving member with a driving pin and a second driving member that pushes the first driving member.

The suppressing material 60 may suppress movement of the driving pin 32 in the radial direction of the driving pin 32, within the opening of the connecting hole 23*a* of the first front blade arm 21, for example, rather than just movement of the driving pin 32 in the direction of rotation of the first front blade arm 21. Moreover, the suppressing material 60 may suppress movement of the driving pin 32 in the axial direction of the driving pin 32 within the opening of the connecting hole 23*a*. Through this, the suppressing material 60 enables a reduction of rubbing between the outer peripheral surface 32*a* of the driving pin 32 and the inner peripheral surface 23*c* of the connecting hole 23*a*, enabling a reduction in wear of the first front blade arm 21. The suppressing material 60 may be provided around the entire circumference, or around just a portion thereof, between the outer peripheral surface 32*a* of the driving pin 32 and the inner peripheral surface 23*c* of the connecting hole 23*a*.

The suppressing material 60 is not limited to a liquid or semi-solid that has viscosity or tackiness, but instead may be an elastic body such as an elastic sealing agent, or the like. A suppressing material 60 that is an elastic body can reduce the kinetic energy of the driving pin 32 of the front blade driving member 31 within the opening of the connecting hole 23*a* of the first front blade arm 21 through elastic deformation thereof. Moreover, the suppressing material 60 undergoes elastic deformation, enabling the driving pin 32 to move within the opening of the connecting hole 23*a*, making possible to produce room for allowing movement of the shutter blades 25-28.

The focal plane shutter 100 may be installed in an electronic apparatus. The electronic apparatus may be, for example, a laptop or notebook PC, or a mobile terminal, such as a smart phone, that has an imaging function.

The present invention can have a variety of embodiments or modifications that do not deviate from the scope of the spirit of the broad definition of the present invention. Moreover, the embodiments set forth above are to explain this invention, and do not limit the scope of the present invention. That is, the scope of the present invention is defined by the claims, not the embodiments. Given this, various modifications that are within the patent claims, or within the scope of the broad meaning of the inventions that are equivalent thereto, are viewed as being within the scope of the invention. The present application is based on Japanese Patent Application 2017-049363, filed on Mar. 15, 2017. The Specification, Claims, and Drawings of Japanese Patent Application 2017-049363 in are incorporated in their entirety, by reference, in this Specification.

The invention claimed is:

1. A focal plane shutter comprising:
a shutter base plate comprising an opening;
a shutter blade opening/closing the opening;
a blade arm pivot-supporting the shutter blade; and
a blade driving member, comprising a driving pin that connects to the blade arm, driving the shutter blade by causing the blade arm to swivel,
wherein the blade arm has a connecting hole into which the driving pin is inserted; and
a suppressing material, suppressing movement of the driving pin within an interior of the connecting hole, is present between an outer peripheral surface of the driving pin and an inner peripheral surface of the connecting hole,
wherein the blade arm comprises:
a bushing wherein the connecting hole is located; and
an arm that has a through hole into which the bushing is fitted.

2. The focal plane shutter as set forth in claim 1, wherein: the suppressing material suppresses movement of the driving pin in the direction of rotation of the blade arm within the interior of the connecting hole.

3. The focal plane shutter as set forth in claim 1, wherein the suppressing material is an elastic body.

4. The focal plane shutter as set forth in claim 1, wherein the suppressing material is viscous or tacky.

5. An imaging device comprising a focal plane shutter as set forth in claim 1.

6. An electronic apparatus comprising a focal plane shutter as set forth in claim 1.

* * * * *